(12) United States Patent
Tomkins et al.

(10) Patent No.: US 9,251,168 B1
(45) Date of Patent: Feb. 2, 2016

(54) DETERMINING INFORMATION ABOUT A LOCATION BASED ON TRAVEL RELATED TO THE LOCATION

(71) Applicant: Google Inc., Mountain View, CA (US)

(72) Inventors: Andrew Tomkins, Menlo Park, CA (US); Sergei Vassilvitskii, New York, NY (US); Shanmugasundaram Ravikumar, Berkeley, CA (US); Mohammad Mahdian, Santa Clara, CA (US); Bo Pang, Sonnyvale, CA (US); Prabhakar Raghavan, Saratoga, CA (US)

(73) Assignee: Google Inc., Mountain View, CA (US)

( * ) Notice: Subject to any disclaimer, the term of this patent is extended or adjusted under 35 U.S.C. 154(b) by 260 days.

(21) Appl. No.: 13/840,820

(22) Filed: Mar. 15, 2013

(51) Int. Cl.
*G06F 17/30* (2006.01)

(52) U.S. Cl.
CPC .................. *G06F 17/30241* (2013.01)

(58) Field of Classification Search
CPC ................................................ G06F 17/30241
USPC ......................................................... 707/724
See application file for complete search history.

(56) References Cited

U.S. PATENT DOCUMENTS

| | | | | |
|---|---|---|---|---|
| 7,911,335 | B1* | 3/2011 | Brady, Jr. | 701/532 |
| 2008/0270938 | A1* | 10/2008 | Carlson | 715/810 |
| 2009/0005968 | A1* | 1/2009 | Vengroff et al. | 701/202 |
| 2009/0005987 | A1* | 1/2009 | Vengroff et al. | 705/10 |
| 2010/0106397 | A1* | 4/2010 | Van Essen | 707/770 |
| 2011/0099048 | A1* | 4/2011 | Weiss et al. | 705/7.34 |
| 2012/0239281 | A1* | 9/2012 | Hinz | 701/117 |
| 2012/0310784 | A1* | 12/2012 | Bartley et al. | 705/27.1 |

* cited by examiner

*Primary Examiner* — Rehana Perveen
*Assistant Examiner* — Tiffany Thuy Bui
(74) *Attorney, Agent, or Firm* — Middleton Reutlinger

(57) ABSTRACT

Methods and apparatus related to determining a characteristic of a location based on visit data associated with the location. Visit data indicative of travel of users to a first location from one or more other locations and/or of travel of users from the first location to one or more other locations may be utilized to determine information about the location. In some implementations visit data may be utilized to determine a connectedness measure and associate the second location with the first location based on the connectedness measure. A characteristic of the first location may optionally be determined based on a characteristic of the second location and/or an attribute associated with the visit data.

25 Claims, 7 Drawing Sheets

DETERMINING INFORMATION ABOUT A LOCATION BASED ON TRAVEL RELATED TO THE LOCATION

BACKGROUND

This specification is directed generally to determining information about a location, and, more particularly, to determining a characteristic of a location based on visit data that is associated with travel of one or more users to one or more other locations from the location and/or from one or more other locations to the location.

Characteristics for locations are often based on analysis of Internet documents related to the locations. For example, a webpage associated with a restaurant may be analyzed to determine a restaurant type and whether the restaurant serves breakfast, lunch, and/or dinner. Also, for example, user reviews and/or professional reviews for a location may be analyzed to determine what types of users frequent the location and/or to determine a quality measure for the location. Determined characteristics for a location may be associated with the location in a database and may be utilized by one or more applications and/or provided to a user. For example, a user search for restaurants in a particular area may return search results for restaurants that are ranked based on the characteristic and/or that are displayed in combination with an indication of the characteristic.

SUMMARY

The present disclosure is directed to methods and apparatus for determining information about a location based on visit data associated with the location. Visit data indicative of travel of users to a first location from one or more other locations and/or of travel of users from the first location to one or more other locations may be utilized to determine information about the location. In some implementations visit data indicative of a user moving from a first location to a second location and/or indicative of a user moving to the first location from the second location may be utilized to determine a connectedness measure and associate the second location with the first location based on the connectedness measure. A characteristic of the first location may optionally be determined based on a characteristic of the second location and/or an attribute associated with the visit data. In some implementations visit data indicative of a group of users moving to and/or from a first location and indicative of a group of users moving to and/or from a second location may be utilized to determine a connectedness measure and associate the second location with the first location based on the connectedness measure. A characteristic of the first location may optionally be determined based on a characteristic of the second location and/or an attribute associated with the visit data. A characteristic of the second location may optionally be determined based on a characteristic of the first location and/or an attribute associated with the visit data. In some implementations a quality measure for the first location may be determined based on the number of other locations to which and/or from which users navigated from or to the first location and geographical distances between the other locations and the first location.

In some implementations a computer implemented method may be provided that includes the steps of: identifying a first location associated with a first geographic location; identifying a second location associated with a second geographic location; identifying visit data indicative of physical visits between the first location and the second location; determining a connectedness measure between the first location and the second location based on the visit data, the connectedness measure indicative of correlation between the first location and the second location and based on a quantity of physical visits to the second location at least one of prior to physically visiting the first location as indicated by the visit data or after physically visiting the first location as indicated by the visit data; and associating the first location as correlated with the second location when the connectedness measure satisfies a connectedness threshold.

This method and other implementations of technology disclosed herein may each optionally include one or more of the following features.

The step of determining the connectedness measure may include: determining at least one distance value from the visit data, the distance value indicative of geographic distance between the first location and the second location; and determining the connectedness measure based at least in part on the distance value. The connectedness measure may become more indicative of correlation between the first location and the second location as the distance value becomes more indicative of a greater geographic distance between the first location and the second location.

The step of determining the connectedness measure may include: determining a first time value indicative of time spent at the first location during one or more of the physical visits; determining a second time value indicative of time spent at the second location during one or more of the physical visits; and determining the connectedness measure based at least in part on the first time value and the second time value. The connectedness measure may be less indicative of correlation between the first location and the second location if at least one of the first time value and the second time value fail to satisfy a time value threshold.

The method may further include the steps of: determining at least one second location characteristic of the second location; and determining at least one first location characteristic of the first location based on the second location characteristic of the second location. The step of determining the at least one first location characteristic of the first location based on the second location characteristic of the second location may be dependent on the connectedness measure between the first location and the second location satisfying the connectedness threshold. The first location characteristic and the second location characteristic may both be location type characteristics. The first location characteristic may be unique from the second location characteristic. The location type for the first location may be a venue and the location type for the second location may be a restaurant.

The step of determining the first location characteristic may include: determining a first time value indicative of time spent at the first location during one or more of the physical visits; determining a second time value indicative of time spent at the second location during one or more of the physical visits; and determining the first location characteristic based at least in part on the first time value and the second time value. The first location characteristic and the second location characteristic are both quality measures. The visit data may be associated with a first user group. The first location characteristic of the first location may be based on the first user group.

This method and other implementations of technology disclosed herein may each optionally include one or more of the following features.

The method may further include the step of determining a frequency of one or more user attributes in the population.

The first location characteristic of the first location may be based on the frequency of the one or more user attributes.

The visit data may be associated with a first user group.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein process visit data associated with a first location to associate the first location with a second location and/or to determine at least one characteristic of the first location and/or the second location. This association and/or characteristic represents a new aspect of the first location and/or the second location that may be derived from the visit data. Particular implementations of the subject matter described herein may utilize determined characteristics of a location to provide additional information about the location, to rate the location, and/or rank search result documents associated with the location.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

DETAILED DESCRIPTION

Figure 1:
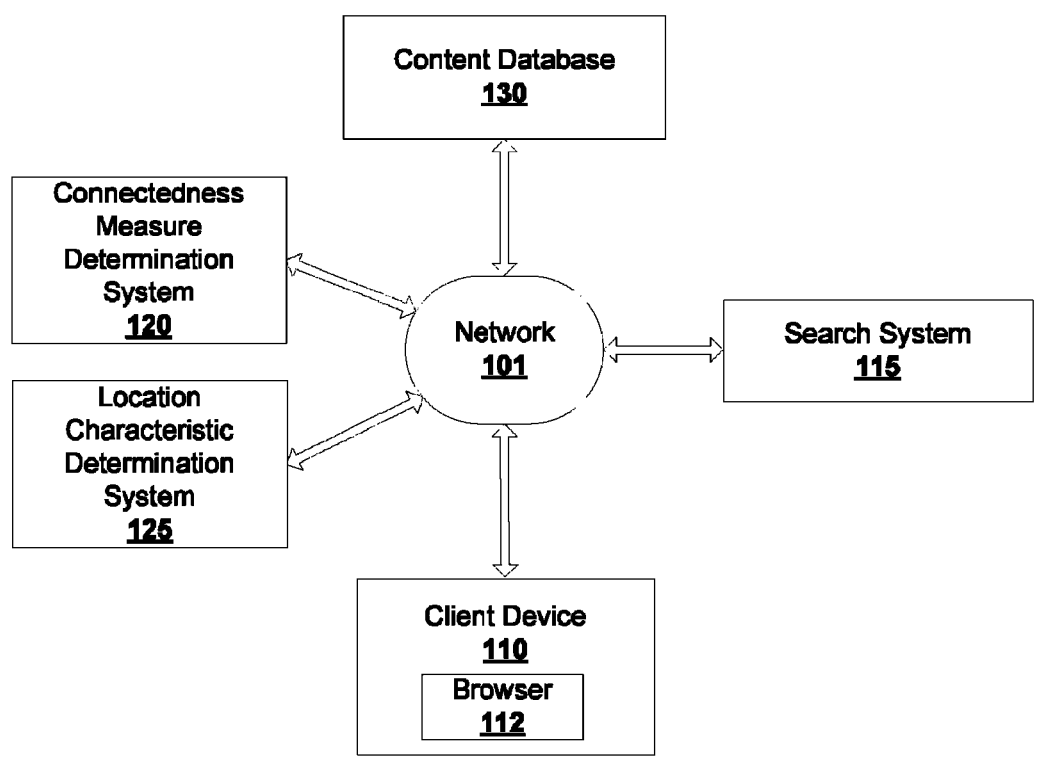
FIG. 1 is a block diagram of an example environment in which a location may be associated with another location and/or a characteristic of a location may be determined based on visit data.

FIG. 1 illustrates a block diagram of an example environment 100 in which in which a location may be associated with another location and/or a characteristic of a location may be determined based on visit data. The example environment 100 includes a communication network 101 that facilitates communication between the various components in the environment. In some implementations the communication network 101 may include the Internet, one or more intranets, and/or one or more bus subsystems. The communication network 101 may optionally utilize one or more standard communications technologies, protocols, and/or inter-process communication techniques. The example environment 100 also includes a client device 110, a search system 115, a connectedness measure determination system 120, a location characteristic determination system 125, and a content database 130.

The connectedness measure determination system 120 may associate a first location with a second location based on a connectedness measure between the first location and the second location satisfying a connectedness threshold. In some implementations the connectedness measure between the first location and the second location is based on visit data indicative of one or more users physically visiting the first location at least one of prior to or after physically visiting the second location. For example, the connectedness measure may be based on visit data of a plurality of users that indicates at least a threshold number of users indicating travel between the first location and the second location. Also, for example, the connectedness measure may additionally be based on the geographical distance between the first location and the second location, wherein a connectedness measure becomes more indicative of correlation between the first and the second locations as geographical distance between the first and second locations increases. Also, for example, the connectedness measure may additionally be based on residence times of users at the first location and/or residence times of users at the second location.

In some implementations the connectedness measure between the first location and the second location is based on visit data indicative of one or more users physically visiting the first location, visit data indicative of one or more users physically visiting the second location, and identification of one or more shared attributes between the visit data indicative of one or more users physically visiting the first location and the visit data indicative of one or more users physically visiting the second location. For example, the connectedness measure may be based on visit data of a first group of users that indicates at least a threshold number of users indicating travel to or from the first location and visit data of a second group of users that indicates at least a threshold number of users indicating a visit to or from the second location. The first group of users and the second group of users may share one or more common attributes as indicated by the visit data. In some implementations the first group of users and the second group of users may include one or more overlapping users. For example, the first group of users and the second group of users may be the same users. Also, for example, the first group of users and the second group of users may each share a common subset of users. The connectedness measure may additionally be based on the geographical distance one or more of the first group of users travelled to/or from the first location and/or the geographical distance one or more of the second group of users travelled to/or from the second location, wherein a connectedness measure becomes more indicative of correlation between the first and the second locations as at least one of the geographical distances increases. Also, for example, the connectedness measure may additionally be based on residence times of the first group of users at the first location and/or residence times of the first group of users at the second location. The connectedness measure determination system 120 is discussed in additional detail herein. In some implementations the connectedness measure determination system 120 may perform one or more of the steps of the method of FIG. 4 and/or FIG. 5.

The location characteristic determination system 125 may determine a characteristic of a first location. In some implementations the characteristic of the first location is based on a characteristic of at least one second location that is associated with the first location. For example, a first location may be a restaurant and a second location may have a characteristic that identifies it as a venue for Broadway plays. An association between the first location and the second location may be utilized to determine a characteristic of the first location that identifies the first location as a pre-venue restaurant and/or as a formal restaurant. In some implementations a characteristic of the first location may be a quality measure for the first location determined based on a quality measure of the second location.

In some implementations the characteristic of the first location is based on one or more attributes associated with one or more of the users visiting the first location and/or one or one or more of the users visiting the second location. For example, a first location may be a restaurant and a second location may also be a restaurant. An attribute associated with one or more of the users visiting the first location and/or one or one or more of the users visiting the second location may be that they are "foodies" (e.g., people who have a hobby and interest in frequenting restaurants). An association between the first location and the second location may be utilized to determine a characteristic of the first location that identifies the first location as a location popular among foodies. An association between the first location and the second location may additionally and/or alternatively be utilized to determine a characteristic of the second location that identifies the second location as a location popular among foodies. In some implementations a characteristic of the first location may be a quality measure for the first location determined based on a quality measure assigned by one or more of the users to the second location. In some implementations a characteristic of the second location may be a quality measure for the second location determined based on a quality measure assigned by one or more of the users to the first location.

In some implementations a characteristic of the first location may be a quality measure for the first location determined based on the number of other locations to which and/or from which users navigated from or to the first location and geographical distances between the other locations and the first location. For example, a quality measure for a given location may be more indicative of quality as the number of locations from which users navigate to the given location increases and/or as the distances traveled by the users increases. For example, when a given location is a restaurant the number of zip codes from which users navigate to the restaurant and/or the distance between the zip codes and the restaurant may be utilized to determine a quality measure of the restaurant.

In some implementations a characteristic of the first location may be a quality measure for the first location determined based on the number of particular user groups that navigated from or to the first location and geographical distances travelled to or from the first location. For example, a quality measure for a given location may be more indicative of quality as the number of user groups that navigate to the given location increases and/or as the distances traveled by the user groups increases. For example, when a given location is a restaurant, the number of users in each of five identified user groups that navigate to the restaurant and/or the distances traveled by the users in each of the five identified user groups in reaching the restaurant may be utilized to determine a quality measure of the restaurant. The location characteristic determination system 125 is discussed in additional detail herein. In some implementations the location characteristic determination system 125 may perform one or more of the steps of the method of FIG. 6 and/or the method of FIG. 8.

In some implementations visit data utilized by the connectedness measure determination system 120 and/or the location characteristic determination system 125 may be identified via the content database 130. For example, in some implementations the content database 130 may include visit data for each of one or more locations. Visit data for a given location may include, for example, for each of one or more visits to a given location, data indicative of: origination location for the visit, destination location for the visit, distance between the origination location and the given location, distance between the given location and the destination location, residence time of the visit at the given location, residence time at the origination location, residence time at the destination location, date of the visit, day of the week of the visit, time of the day of the visit, and/or user attribute data associated with the visit. In some implementations, any visit data may be anonymized and not traceable to a particular user. For example, in some implementations visit data associated with an origination location for a given location may only be accessible when at least a threshold of users have navigated from the origination location to the given location. Also, for example, in some implementations a given location and a distance measure in reaching the given location may be provided, but the origination location in travelling to the given location may not be provided. Also, for example, in some implementations visit data may include data that represents a summary of actual and/or indicated visits from a plurality of users. For example, an origination location may be a neighborhood and other data associated with the origination location that may represent a summary of data from a group of users from that neighborhood. For example, the distance between the origination location and the given location may be an average of distance values associated with the group of users and/or may be based on a distance between the geographic center of the neighborhood and the given location. Additional and/or alternative forms of visit data may be utilized such as those additional and/or alternative forms discussed herein. Visit data may be based on one or more actual and/or indicated visits from users such as those discussed herein. For example, visit data may be based on one or more of navigational queries, geolocation data from mobile devices, financial transactions at a given location, user indications of visits to a given location, etc.

In some implementations utilized visit data may be restricted based on one or more aspects of the visit data. For example, visit data may be restricted based on the range of dates of the visits, days of the week of the visits, and/or time of the day of the visits. Also, for example, visit data may be restricted to certain user attributes associated with the visit data. For example, visit data may be restricted to a certain age range associated with the visit data to determine a connectedness measure between two locations among a particular age range. For example, visit data may be restricted to a certain user type associated with the visit data to determine a connectedness measure between two locations among a particular user type.

As discussed, the connectedness measure determination system 120 may associate a first location with a second location based on a connectedness measure. In some implementations the connectedness measure is based on visit data indicative of one or more users physically visiting the first location at least one of prior to or after physically visiting the second location.

For example, the connectedness measure may be based on the number and/or percentage of users that are indicated as travelling from the first location to the second location based on the visit data. Also, for example, the connectedness measure may be based on visit data of a plurality of users that indicates at least a threshold number of users indicating a visit from the first location to the second location and/or to the first location from the second location. For example, in some implementations a threshold number of users may be at least a threshold percentage of users. For example, the threshold percentage may be 2% for a Venue A, it may be determined that the visit data indicates that 5% of the visits to Venue A originated from Restaurant B, and the connectedness measure may be based on such a determination. Also, for example, the connectedness measure may be indicative of potential correlation between two locations if at least a threshold number of users indicate a visit between the two locations. In some implementations the threshold may be a fixed threshold. In some implementations the threshold may be based on the location type (e.g., venue, restaurant, retail store) of the first location and/or the second location. In some implementations the threshold may be based on the visit data itself. For example, statistical analysis may be performed on the visit data for Venue A to determine a statistically significant threshold. For example, it may be determined that only Restaurant B and Restaurant C are associated with a statistically significant threshold number and/or percentage of visits to Venue A based on a distribution of numbers of users in visits between locations and Venue A.

Also, for example, the connectedness measure may additionally be based on the geographical distance between the first location and the second location, wherein a connectedness measure becomes more indicative of correlation between the first and the second location as geographical distance between the first and second location increases. For example, for a Venue A, it may be determined that the visit data indicates that 5% of the visits to Venue A originated from Restaurant B, that 5% of the visits to Venue A originated from Restaurant C, that the distance from Venue A to Restaurant B is 1 mile and the distance from Venue A to Restaurant C is 4 miles. The connectedness measure between Venue A and Restaurant C may be more indicative of correlation than the connectedness measure between Venue A and Restaurant B due to the greater distance between Venue A and Restaurant C.

In some implementations the distance between two locations may be based on the distance along a straight line between the two locations. In some implementations the distance between two locations may be based on the distance along one or more travel paths between two locations. For example, the distance may be based on driving, walking, biking, and/or taking public transportation between two locations. In some implementations the distance may be based on any distance indicated by the visit data. For example, the distance between two locations may take into account one or more modes of transportation indicated in the visit data. Also, for example, the visit data may directly indicate a distance traveled for one or more movements between a first location and a second location. In some implementations the distance between two locations may be represented as one or more distributions. Such distributions may be continuous and/or discrete. In some implementations the travel time between two locations may be based on the travel time between the two locations. For example, the distance may be based on travel time based on driving, walking, biking, and/or taking public transportation between two locations. In some implementations the distance may be based on the travel time indicated by the visit location data. For example, the distance between two locations may take into account one or more modes of transportation indicated in the visit data. Also, for example, the visit data may indicate a travel time for one or more movements between a first location and a second location.

In some implementations the distance between two locations may be based on other measures between the two locations. For example, the distance may be based on the number of intervening neighborhoods, counties, and/or zip codes between two locations. Any determined distance may be based on one or more factors such as those discussed herein. For example, distance between two locations may be based on actual visit data between the two locations and an estimated distance based on one or more travel paths between the two locations. Additional and/or alternative factors may be taken into account in one or more determined distances between two locations.

In some implementations the connectedness measure may be based on both the number of users indicating a visit between the first location and the second location and the geographical distance between the first location and the second location. For example, where the connectedness measure is represented by C, the number of users indicating a visit between the first location and the second location may be represented by "# of Users", and the distance between the first location and the second location may be represented by "Distance", and C may be based on: (# of Users)*(Distance). In some implementations # of Users may be the actual number of users or a percentage of the users and Distance may be the determined distance. In some implementations the # of Users may equal 1 if it satisfies a threshold and equal 0 otherwise. In some implementations the distance may be based on the range in which the distance falls. For example, Distance may be 0.5 for distances between 0 and 1 miles, 0.75 for distances between 1 and 2 miles, 1 for distances between 2 and 4 miles, etc. Additional and/or alternative connectedness measures taking into account the number of users indicating a visit between the first location and the second location and the geographical distance between the first location and the second location may be utilized.

Also, for example, the connectedness measure may additionally be based on residence times of users at the first location and/or residence times of users at the second location. For example, in some implementations the connectedness measure between two locations may be based on whether an average residence time at the first location and/or an average residence time at the second location satisfies a time threshold. For example, in some implementations short residence times at location A on the way to location B may be less indicative of association between the two locations than would lengthy residence times at location A followed by lengthy residence times at location B. In some implementations visit data related to travel between a first location and a second location may be excluded from a connectedness measure determination if residence time associated with the first location and/or second location of the visit data fails to satisfy a time threshold. In some implementations residence time may not be provided with some or all of the visit data. In some implementations residence time may not be utilized in determining a connectedness measure.

Also, for example, the connectedness measure between a first location and a second location may additionally be based on one or more geographic characteristics associated with the first location and/or the second location. For example, Restaurant A and Restaurant B may be the same distance away from Venue A and the same number of users may travel from Restaurant A to Venue A as travel from Restaurant B to Venue A. However, a path between Restaurant A and a Venue A may pass (or come within a defined diversion distance of) three different restaurants that are similar to Restaurant A on the way to venue A, while a path between Restaurant B and the Venue A may not pass (or come within a defined diversion distance of) any different restaurants that are similar to Restaurant B on the way to venue A. In such a situation the connectedness measure of Restaurant A may be more indicative of association with venue A than the connectedness measure of Restaurant B due to the larger number of similar restaurants bypassed in traveling from Restaurant B.

Also, for example, the connectedness measure between two locations may be based on a rank associated with one or more of the locations. For example, the connectedness measure between a given restaurant and a given venue may be based on a number of competing restaurants within a certain distance of the given restaurant and/or based on a number of competing restaurants within a certain distance of the given venue. Also, for example, the connectedness measure between a given restaurant and a given venue may be based on a number of competing venues within a certain distance of the given venue and/or based on a number of competing venues within a certain distance of the given restaurant. For example, the rank for a given restaurant may be based on density of competing restaurants within five miles of the given restaurant. In some implementations the rank for a given location may be based on visit data. For example, visit data from users who indicate travel between two locations may be utilized to determine paths of the users and, for each path, how many competing locations of one or both of the two locations were passed (or within a defined diversion distance) along the path. Also, for example, visit data from a user group that indicates travel to a location may be utilized to determine one or more paths of the users of the user group and, for each path, how many competing locations of the location were passed (or within a defined diversion distance) along the path. A greater number of competing locations passed may lead to a connectedness measure more indicative of association between the locations.

Also, for example, the connectedness measure may be based on visit data of a plurality of users that indicates at least a threshold number of a first group of users indicating a visit to the first location and at least a threshold number of the second group of users indicating a visit to the second location. The first and second groupings share one or more attributes. In some implementations the first and second groupings may be the same. In some implementations a threshold number may be at least a threshold percentage. For example, the threshold percentage may be 5% of total visits for both the first location and the second location, it may be determined that the visit data indicates that 10% of the visits to Venue A originated from the first group of users and that 15% of the visits to Venue B originated from the second group of users, and the connectedness measure may be based on such a determination. In some implementations the threshold associated with the first location may be based on the location type of the first location and/or the location type of the first location. In some implementations the threshold associated with the second location may be based on the location type of the first location and/or the location type of the second location. In some implementations the threshold may be based on one or more attributes of the first group of users and/or the second group of users. In some implementations the threshold may be based on the visit data itself.

Also, for example, the connectedness measure may additionally be based on the geographical distance traveled by the first group of users to the first location and/or the geographical distance traveled by the second group of users to the second location, wherein a connectedness measure becomes more indicative of correlation between the first and the second location as at least one of the geographical distances increases.

For example, for a Venue A, it may be determined that the visit data indicates that 500 visits to Venue A originated from a first group of users and 500 visits to Venue B originated from a second group of users sharing one or more attributes with the first group of users. It may further be determined that a determined distance value for the first group of users to the Venue A is 4 miles and that a determined distance value for the second group of users to the Venue B is 4 miles. The connectedness measure between Venue A and Venue B in such a scenario may be less indicative of connectedness than the connectedness measure if the determined distance value for the first group of users to the Venue A were 8 and/or a determined distance value for the second group of users to the Venue B were 8 miles.

In some implementations the determined distance value for a group of users to a location may be based on actual travel distance and/or actual travel time by one or more users in the group in reaching the location. For example, the determined distance value may be a mean, median, or other determined statistical measure of actual travel distances identified via visit data. In some implementations the determined distance value for a group of users may be based on the distance along one or more travel paths of the users in reaching the location. In some implementations the determined distance value may be represented as one or more distributions. Such distributions may be continuous and/or discrete. In some implementations the determined distance value for a group of users to a location may be based on actual and/or assumed travel distances of a subset of users of the group. For example, the determined distance value may be based on a subset of visit data for which travel times and/or distances is available. In some implementations the determined distance value may be based on other measures between two locations. Additional and/or alternative factors may be taken into account in one or more determined distance value for a group of users.

In some implementations the connectedness measure may be based on both: the number of the first group of users indicating a visit to the first location and a number of the second group of users indicating a visit to the second location; and the geographical distance traveled by the first group of users to the first location and/or the geographical distance traveled by the second group of users to the second location. For example, where the connectedness measure is represented by C, the number of the first group of users indicating a visit to the first location may be represented by "# of Users1", the number of the first group of users indicating a visit to the second location may be represented by "# of Users1", the distance value for the first group of users in travelling to the first location may be "Distance 1", and the distance value for the first group of users in travelling to the second location may be "Distance 2", C may be based on: [(# of Users1)*(Distance)]*[(# of Users1)*(Distance)]. In some implementations # of Users1/2 may be the respective actual number of users or a percentage of the users and Distance1/2 may be the respective determined distance. In some implementations the # of Users1/2 may equal 1 if it satisfies a threshold and equal 0 otherwise. In some implementations the distance may be based on the range in which the distance falls. For example, Distance1/2 may be 0.5 for distances between 0 and 1 miles, 0.75 for distances between 1 and 2 miles, 1 for distances between 2 and 4 miles, etc. Additional and/or alternative connectedness measures may be utilized.

In some implementations the visit data indicative of one or more users physically visiting the first location at least one of prior to or after physically visiting the second location may include visit data indicative of travel directly between the first location and the second location without any intervening stops. In some implementations the visit data indicative of one or more users physically visiting the first location at least one of prior to or after physically visiting the second location may additionally and/or alternatively include visit data indicative of travel between the first location and the second location with one or more intervening stops. In some implementations visit data indicative of travel between the first location and the second location with one or more intervening stops may optionally be weighted less significantly (e.g., in determining any associated number of users, distance, and/or residence time). For example, visit data indicative of travel between the first location and the second location with one or more intervening stops may optionally be provided a decreasing weight as the number intervening stops increases. In some implementations thresholding of certain visit data may be implemented based on the number of intervening stops. For example, visit data indicative of travel between the first location and the second location with one or more intervening stops may only be taken into account if less than a threshold of intervening stops are present.

In some implementations the visit data indicative of one or more users physically visiting the first location at least one of prior to or after physically visiting the second location may additionally and/or alternatively include visit data indicative of various passages of time between leaving the first location and arriving at the second location. For example, in some implementations only visit data that is indicative of presence at the second location within a threshold of time (e.g., within 1 hour of leaving the first location) may be utilized. Also, for example, in some implementations visit data that exceeds a threshold of time may optionally be weighted less significantly (e.g., in determining any associated number of users, distance, and/or residence time).

In some implementations visit data indicative of a first group of one or more users physically visiting a first location and a second group of one or more users physically visiting a second location may include data indicative of travel directly between the first location and the second location without any intervening stops. In some implementations the visit data indicative of a first group of one or more users physically visiting a first location and a second group of one or more users physically visiting a second location may additionally and/or alternatively include visit data indicative of travel with one or more intervening stops. In some implementations visit data indicative of a first group of one or more users physically visiting a first location and a second group of one or more users physically visiting a second location with one or more intervening stops may optionally be weighted less significantly (e.g., in determining any associated number of users, distance, and/or residence time).

In some implementations the visit data indicative of a first group of one or more users physically visiting a first location and a second group of one or more users physically visiting a second location may additionally and/or alternatively include visit data indicative of various passages of time in travel to the first location from other locations and/or the second location from other locations. For example, in some implementations only visit data that is indicative of travel from an initial location to the second location within a threshold of time (e.g., within 1 hour of leaving the initial location) may be utilized. Also, for example, in some implementations visit data that exceeds a threshold of time may optionally be weighted less significantly (e.g., in determining any associated number of users, distance, and/or residence time). In some implementations visit data that is indicative of travel to or from a location may be utilized regardless of the passage of time.

Additional and/or alternative factors may be utilized in determining a connectedness measure between two locations. For example, the connectedness measure between a first location and a second location may be based on the location type of the first location and/or the second location. For example, location types such as "retail store", "restaurant", and/or "venue" and/or more granular location types such as "grocery stores", "clothing stores", "fast food restaurants", "fine dining restaurants", "music venues", "movie venues", "small French restaurant", "quirky venues", etc. may be associated with one or more locations. Such a location type indication of a first location and/or a second location may be utilized as part of a connectedness measure. For example, in some implementations when a first location and a second location share a common location type, the connectedness measure may be more indicative of correlation between the locations. Also, for example, in some implementations certain location types may be mapped to one another (e.g., restaurants and venues) and the connectedness measure may be based on such a mapping. In some implementations common location types and/or a mapping between location types may be required for two locations to be associated with one another.

Figure 2A:
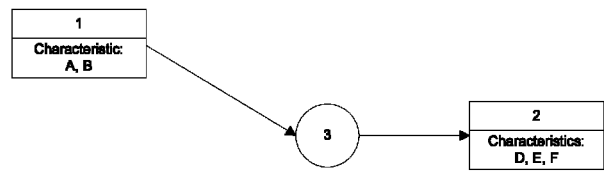
FIGS. 2A-2F illustrate examples of visits to or from locations.
Figure 2B:
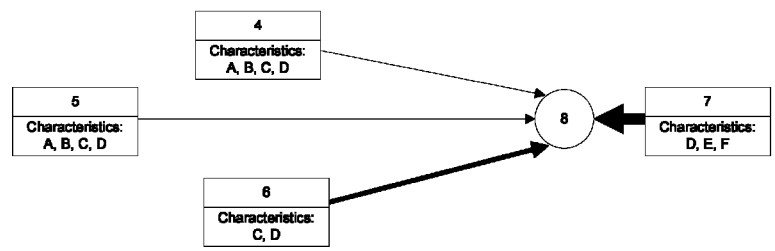
Figure 2C:
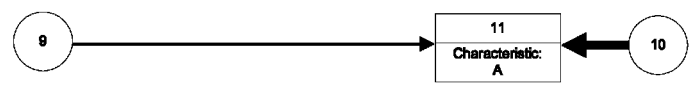
Figure 2D:
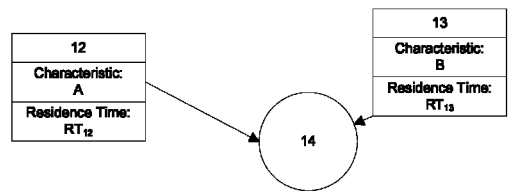
Figure 2E:
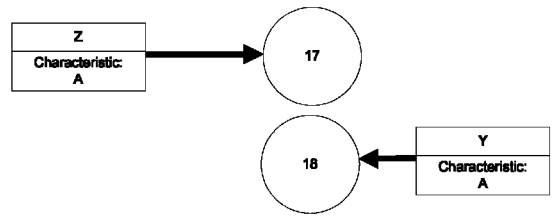
Figure 2F:
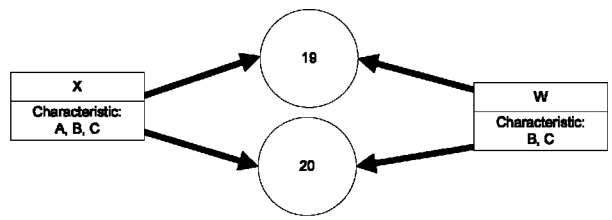

Referring to FIGS. 2A-2F, examples are illustrated visits to or from locations. In FIGS. 2A-2D the numbers represent locations and the direction of the arrows between the locations indicate whether travel is to or from the locations. For example, in FIG. 2A the arrow between location 1 and location 3 indicates travel from location 1 to location 3 and the arrow between location 3 and location 2 indicates travel from location 3 to location 2. The length of each of the arrows is indicative of the distance between the locations between which they extend and the weight of the arrows is indicative of the number of visits between the locations between which they extend. In FIGS. 2E-2F the numbers represent locations, the letters W-Z represent user groups, and the arrows between the user groups and the locations indicate travel to the locations. The length of each of the arrows is indicative of the distance traveled by the user group in travelling to the location and the weight of the arrows is indicative of the number of visits from the user group to the location. As discussed herein, in some implementations visits to or from a location may include one or more intervening locations. Moreover, such intervening locations may optionally be taken into account in determining a number of users travelling to or from a location and/or in determining a distance in travelling to or from a location. For the sake of simplicity, any such intervening locations are not illustrated in FIGS. 2A-2F For example, in FIG. 2A the connectedness measure between location 1 and location 3 may be greater than the connectedness measure between location 2 and location 3 because of the greater distance between location 1 and location 3. As discussed herein, the connectedness measure may be utilized in determining whether to associate two locations. For example, in FIG. 2A location 1 and location 3 may be associated due to the connectedness measure satisfying a connectedness threshold, but location 3 and location 2 may not be associated due to the connectedness measure failing to satisfy a connectedness threshold. In some implementations both location 1 and location 2 may have connectedness measures that satisfy the connectedness threshold.

Also, for example, in FIG. 2B the connectedness measure between location 5 and location 8 may be greater than the connectedness measure between location 4 and location 8 due to the arrows having the same weighting, but the arrow between location 5 and location 8 being of greater length. In some implementations any determined connectedness measure taking into account a number of visits between the locations and the distance between the locations may weight the number of visits between the locations and the distance between the locations equally. In some implementations one of either the number of visits between the locations and the distance between the locations may be weighted more heavily. Also, for example, in FIG. 2B the connectedness measure between location 6 and location 8 may be greater than the connectedness measure between location 4 and location 8 due to the arrows having the same length, but the arrow between location 6 and location 8 being of greater weight. Also, for example, in FIG. 2B the weighting of the arrow between location 7 and location 8 is of significantly greater weight than the other arrows, but the connectedness measure between location 7 and location 8 may be similar to the connectedness measures between locations 5 and 8 and 6 and 8 due to the shorter length of the arrow between location 7 and location 8. As discussed herein, the connectedness measure may be utilized in determining whether to associate two locations. For example, in FIG. 2B locations 5, 6, and 7 may be associated with location 8 due to the respective connectedness measures satisfying a connectedness threshold, but location 4 and location 8 not associated due to the connectedness measure failing to satisfy a connectedness threshold.

Also, for example, in FIG. 2C the connectedness measure between location 9 and location 11 may be similar to the connectedness measure between location 10 and location 11 due to the arrow between location 9 and location 11 having longer length but less weight relative to the arrow between location 10 and location 11. As discussed herein, the connectedness measure may be utilized in determining whether to associate two locations. For example, in FIG. 2C locations 9 and 10 may both be associated with location 11 due to the respective connectedness measures satisfying a connectedness threshold.

Also, for example, in FIG. 2D, residence time $RT_{12}$ is associated with location 12 and residence time $RT_{13}$ is associated with location 13. Residence time $RT_{13}$ may be greater than residence time $RT_{12}$. The connectedness measure between location 12 and location 14 may be substantially the same as the connectedness measure between location 13 and location 14 due to the arrows having the same weighting, the arrow between location 12 and location 14 being of greater length, but the residence time $RT_{13}$ being greater than residence time $RT_{12}$.

Also, for example, in FIG. 2E the connectedness measure between location 17 and location 18 may be based on: the number of people travelling between user group Z and location 17 and/or distances traveled by one or more users of user group Z to location 17; and the number of people travelling between user group Y and location 18 and/or the distance traveled by one or more users of user group Y to location 18. User group Y and user group Z are similar user groups that share the attribute A in common. In some implementations the groups Y and Z may share additional attributes in common and/or have one or more uncommon attributes. In some implementations groups Y and Z may share some or all of the same users. User attributes for a group may be determined, for example, based on visit data associated with visits to or from a given location. For example, visit data may identify and/or be indicative of one or more user attributes associated with one or more visits to a location. Locations 17 and 18 may satisfy a connectedness threshold and be associated due to the large numbers of users in the common groups Y and Z visiting respective of locations 18 and 17 and/or due to the distance traveled by the users in common groups Y and Z in reaching respective of locations 18 and 17.

Also, for example, in FIG. 2F the connectedness measure between location 19 and location 20 may be based on: the number of people travelling between user group X and locations 19 and 20 and/or distances traveled by one or more users of user group X to locations 19 and 20; and the number of people travelling between user group W and locations 19 and 20 and/or distances traveled by one or more users of user group W to locations 19 and 20. User group W and user group X are similar user groups that share the attributes B and C in common. In some implementations the groups W and X may share additional attributes in common and/or have one or more uncommon attributes. Locations 19 and 20 may satisfy a connectedness threshold and be associated due to the large numbers of users in the common groups W and X visiting both locations 19 and 20 and/or due to the distance traveled by the users in common groups W and X in reaching respective of locations 19 and 20.

In some implementations a determined association between two locations based on a connectedness measure may be stored in a database, such as content database 130. Any stored association between two locations may be accessed by one or more components. For example, in some implementations identified associations between a first location and a second location based on a connectedness measure may be utilized to recommend the second location to a user when the user indicates interest in the first location. For example, in some implementations the second location may be recommended to a user based on identification of presence of the user at the first location. For example, a mobile phone of a user may provide an indication of the presence of the user in the first location and a recommendation for the second location may be provided to the user via the mobile phone. Also, for example, a user may issue a search for the first location via the search system 115 and/or may issue a search that returns search results responsive to the first location. The search system 115 may identify the association between the first location and the second location and additionally present search results responsive to the second location. For example, the search system 115 may enable a map based search and, in response to a search query that returns results that include the first location, may additionally recommend the second location to the user.

In some implementations, when connectedness measures are determined based on visit data conforming to one or more user attributes, recommendations and/or search results may be tailored to the attributes of the user. For example, recommendations to a user may be made when there is an association between two locations based on a user attribute and the user conforms to that attribute. For example, an association between a first location and a second location may be identified for a first age range, but not identified for a second age range. A user that visits the location may be provided a recommendation for the second location if they are in the first age range, but not if they are in the second age range.

The location characteristic determination system 125 may determine a characteristic of the first location. In some implementations the characteristic of the first location is based on a characteristic of at least one second location that is associated with the first location.

For example, in FIG. 2A location 1 may be associated with location 3 based on the connectedness measure between location 1 and location 3. One or more characteristics may be associated with location 3 based on one or more of characteristics A and B of location 1. For example, in some implementations location 1 may be a first retail location having known characteristic A that identifies the location as a home furnishings store and characteristic B that identifies the location as having luxury home furnishings. Due to the association between location 1 and location 3, a characteristic related to characteristics A and B may be associated with location 3. For example, a characteristic of "store", "home store", "home furnishings store", and/or "luxury home furnishings store" may be associated with location 3.

Also, for example, in FIG. 2B location 8 may be associated with locations 5, 6, and 7 based on the connectedness measures between location 8 and locations 5, 6, and 7. One or more characteristics may be associated with location 8 based on one or more of the characteristics of locations 5, 6, and 7. For example, characteristic D may be identified as a characteristic that is shared between locations 5, 6, and 7 and may be associated with location 8 based on the associations between locations 5, 6, and 7 and location 8. For example, locations 5, 6, and 7 may all be entertainment locations. Characteristic D may be a characteristic that identifies an entertainment location popular among a younger crowd. Accordingly, based on the associations between locations 5, 6, and 7 and location 8, location 8 may also be associated with characteristic D and identified as an entertainment location popular among a younger crowd. Also, for example, locations 5, 6, and 7 may all be restaurants and location 8 may be a venue. Characteristic D may be a characteristic that identifies a restaurant as a formal dining establishment. Accordingly, based on the associations between locations 5, 6, and 7 and location 8, location 8 may also be associated with characteristic D and identified as a formal venue.

Also, for example, characteristic D may be a characteristic that is based on one or more identified user attributes from the visit data associated with visits from respective of locations 4, 5, 6, and 7. For example, characteristic D may be indicative of a certain age range of visitors that is prevalent in visit data associated with visits from respective of locations 4, 5, 6, and 7. Accordingly, based on the associations between locations 5, 6, and 7 and location 8, location 8 may also be associated with characteristic D and identified as a location popular among a certain age range. Also, for example, characteristic D may a characteristic that is based on a certain location attribute of visitors that is prevalent in visit data associated with visits from respective of locations 4, 5, 6, and 7, such as a location attribute that is indicative of an "out of town" visitor. Accordingly, based on the associations between locations 5, 6, and 7 and location 8, location 8 may also be associated with characteristic D and identified as a location popular among visitors from out of town.

In some implementations characteristic C may be identified as a characteristic that is shared between locations 4, 5, and 6 and may be associated with location 8 based on the associations between locations 5 and 6 and location 8. In some implementations characteristic C may be associated with location 8 with a lower weight than characteristic D due to the larger number of associated locations sharing characteristic D and/or the greater weighting and/or distance associated with the multiple connections to location 8 from locations with characteristic D relative to the locations with characteristic C.

In some implementations a connectedness threshold may be set so that the locations 4, 5, 6, and 7 are all associated with location 8. For example, the connectedness threshold may be set to zero. In some of those implementations any of the characteristics of locations 4, 5, 6, 7 that are the basis for associating a characteristic with location 8 may be based on the quantity and/or the weighting of the characteristics. For example, those characteristics occurring most frequently among locations 4, 5, 6, 7 may be associated with location 8. Also, for example, characteristics of locations 4, 5, 6, 7 may be weighted based on how often they occur among locations 4, 5, 6, 7, based on the number of users traveling to location 8 from locations having the characteristics, and/or based on the distances associated with travel to location 8 from locations having the characteristics.

Also, for example, in FIG. 2C location 11 may be associated with locations 9 and 10 based on the connectedness measures between location 11 and locations 9 and 10. One or more characteristics may be associated with locations 9 and 10 based on the characteristic A of location 11. For example, locations 9 and 10 may be restaurants and characteristic A may be a characteristic that identifies location 11 as a formal venue for Broadway plays and other performances. Locations 9 and 10 may be identified as pre-venue restaurants for location 11 and/or identified as formal restaurants based on the characteristic A.

Also, for example, in FIG. 2D location 14 may be associated with locations 12 and 13 based on the connectedness measures between location 14 and locations 12 and 13. One or more characteristics may be associated with location 14 based on the characteristic A of locations 12 and 13. For example, locations 12 and 13 may be restaurants and characteristic A may be a characteristic that identifies the locations as restaurants and location 14 may be identified as post-restaurant venue based on the characteristic A.

In some implementations a characteristic of location 14 may additionally and/or alternatively be based on the residence times $RT_{12}$ and $RT_{13}$ associated with locations 12 and 13 and/or a residence time associated with location 14. For example, locations 12 and 13 may be night clubs, characteristic A may be a characteristic that identifies the locations as night clubs, and the residence times $RT_{12}$ and $RT_{13}$ may identify that those traveling from locations 12 and 13 to 14 are typically at locations 12 and 13 for more than two hours before traveling to location 14. Based on those residence times, the location 14 may be identified with a characteristic of a post-night club restaurant. One or more residence times associated with the location 14 may also be utilized to determine that those arriving at location 14 from locations 12 and 13 stay for a duration that is indicative of having a meal at location 14. In some implementations one or more user attributes associated with the visit data may optionally additionally or alternatively be utilized to determine a characteristic of the locations. For example, user attributes may identify that a large percentage of those traveling from locations 12 and 13 to 14 are in an age-range that typically frequents night clubs. Those user attributes may be utilized to associate location 14 with a characteristic of a post-night club restaurant and/or to verify such a determination made based on characteristic A and/or residence times $RT_{12}$ and $RT_{13}$.

Also, for example, locations 12 and 13 may be restaurants and the residence times $RT_{12}$ and $RT_{13}$ may identify that those traveling from locations 12 and 13 to 14 are typically at locations 12 and 13 for a time that is indicative of having a meal. Based on those residence times, the location 14 may be identified with a characteristic of a post-restaurant venue. One or more residence times associated with the location 14 may also be utilized to determine a characteristic of location 14. For example, residence times associated with those arriving at location 14 from locations 12 and 13 may indicate that they typically stay for a duration that is indicative of having dessert at location 14 and location 14 may thus be associated with a characteristic of being a dessert location.

In some implementations the characteristic of a location may additionally and/or alternatively be based on an attribute of at least one user group that is associated with the first location and/or the second location. For example, in FIG. 2E locations 17 and 18 may satisfy a connectedness threshold and be associated due to the large numbers of users in the common groups Y and Z visiting respective of locations 18 and 17 and/or due to the distances traveled by the users in common groups Y and Z in reaching respective of locations 18 and 17. One or more characteristics may be associated with locations 17 and/or 18 based on the shared attribute A of user groups Y and Z. For example, locations 17 and 18 may be restaurants and attribute A may be an attribute that indicates a likelihood that the users are "foodies" and locations 17 and 18 may be identified with a characteristic that identifies them as restaurants popular among foodies based on the attribute A. Such an associated characteristic may be utilized, for example, to recommend restaurants 17 and/or 18 to other users who are likely foodies. In some implementations locations 17 and 18 may be mapped to one another based on the shared characteristic. In some implementations one or more characteristics of location 17 may additionally and/or alternatively be identified and associated with location 18, or vice versa. For example, location 17 may be a restaurant and a characteristic may be an identified characteristic of location 17 that identifies the restaurant as an Italian restaurant and location 18 may be identified as an Italian restaurant based on the characteristic of location 17.

Also, for example, in FIG. 2F locations 19 and 20 may satisfy a connectedness threshold and be associated due to the large numbers of users in the common groups W and X visiting both locations 19 and 20 and/or due to the distances traveled by the users in common groups W and X in reaching respective of locations 19 and 20. One or more characteristics may be associated with locations 19 and/or 20 based on the shared attributes B and C of user groups W and X. For example, locations 19 and 20 may be restaurants and attributes B and C may be attributes that indicate the users are locals who enjoy new experiences and locations 19 and 20 may be identified with a characteristic that identifies them as restaurants popular among locals who enjoy new experiences. Such an associated characteristic may be utilized, for example, to recommend restaurants 19 and/or 20 to other users identified as locals and/or those who enjoy new experiences. In some implementations locations 19 and 20 may satisfy a connectedness threshold and be associated based solely on those in group X visiting both locations 19 and 20. In such a situation, attribute A of group X may also be utilized to associate a characteristic with locations 19 and/or 20. In some of those situations any characteristic based on attribute A may be assigned a weighting that is less than any weighting assigned to a characteristics based on attributes B and/or C, due to attribute A being associated with group X and not also being associated with group W. Also, for example, locations 19 and 20 may be restaurants and attributes B and C may be attributes that indicate a likelihood that the users are sophisticated diners who enjoy highly rated restaurants and locations 19 and 20 may be identified with a characteristic that identifies them as a highly rated restaurant based on such attributes. In some implementations locations 19 and 20 may be mapped to one another based on one or more shared characteristics.

Figure 3:
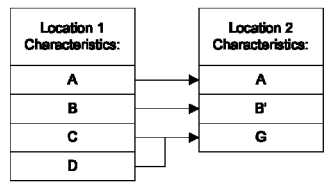
FIG. 3 illustrates a mapping between a list of characteristics associated with a first location and a list of characteristics associated with a second location.

As illustrated by the examples provided in FIGS. 2A-2D, a characteristic of a first location determined based on a characteristic of a second location does not have to be the same as the characteristic of the second location. This is further illustrated in FIG. 3, which illustrates a mapping between a list of characteristics associated with a first location and a list of characteristics associated with a second location. When location 1 and location 2 are identified as associated, a characteristic A of location 1 may be utilized to associate the same characteristic A with location 2. For example, a characteristic A that identifies location 1 as expensive may be utilized to identify location 2 as expensive. Also, for example, a characteristic A that identifies location 1 as high quality may be utilized to identify location 2 as high quality. Also, when location 1 and location 2 are identified as associated, a characteristic B of location 1 may be utilized to associate a related characteristic B' with location 2. For example, a characteristic B that identifies location 1 as a formal venue may be utilized to associate location 2 with a characteristic B' that identifies location 2 as a fine dining restaurant. Also, for example, a characteristic B that identifies location 1 as a top-rated restaurant may be utilized to positively adjust a quality measure characteristic of location 2 to B' that may be elevated with respect to a previous quality measure, but may not be "top-rated". Also, when location 1 and location 2 are identified as associated, characteristic C and D of location 1 may be utilized to identify a distinct characteristic G with location 2. For example, a characteristic C that identifies location 1 as a store and a characteristic D that identifies the store as highly popular among families with young children may be utilized to identify location 2 with a characteristic G that indicates a kid friendly restaurant. Moreover, as discussed herein, any determined characteristic may additionally and/or alternatively take into account user attributes and/or residence time(s) at a first and/or second location. Also, a characteristic of a location determined based on an attribute of one or more user groups visiting the location and/or an associated location does not have to be the same as the attribute of the one or more user groups.

The location characteristic determination system 125 may additionally and/or alternatively determine a characteristic that is a quality measure for the first location based on the number of other locations to which and/or from which users navigated from or to the first location and geographical distances between the other locations and the first location.

For example, in some implementations the quality measure for a given location may be based on connectedness measures associated with the given location that take into account geographical distances. For example, where the connectedness measure between a given location and another location i is represented by $C_i$ and takes into account the geographical distance, the quality measure may be represented by: Quality Measure=$f(C_1, C_2, \ldots, C_n)$, wherein n is the number of locations associated with the given location. For example, the quality measure may be based on: $\Sigma_i^n C_i$. Additional and/or alternative quality measure determinations may be made based on the connectedness measure. In some implementations only connectedness measures that satisfy a connectedness threshold may be utilized in determining the quality measure. For example, as discussed herein with respect to the connectedness measure determination system 120, in some implementations a connectedness threshold may be identified. In some of those implementations any quality measure determined based on the connectedness measures may optionally only include connectedness measures that satisfy the connectedness threshold.

In some implementations the quality measure for a given location may be based on the number of unique locations from which travel to the given location is indicated and/or to which travel from the given location is indicated without weighting travel to/from locations based on the number of users that navigated from any of the unique locations to the given location. For example, where the geographical distance between a given location and another location i is represented by $D_i$, the quality measure may be represented by: Quality Measure=$f(n; g(D_1, D_2, \ldots, D_n))$, wherein n is the number of locations from which at least a threshold of users traveled to and/or from the given location. For example, the threshold may be one user. Other thresholds may be utilized. In some implementations the quality measure may be based on:

$$n + \left(\frac{\sum_i^n D_i}{n}\right).$$

In some implementations the quality measure may be based on: $n + \sum_i^n p_i D_i$, wherein $\sum_i^n p_i = 1$ and $p_i$ is a weighting factor for each distance associated with another location i. For example, in some implementations $p_i$ may be based on one or more factors such as the ranking of location i such as the ranking described herein, the number of users traveling to the given location from the location i, average residence time at the location i, and/or a geographic region characteristic associated with the location i. In some implementations a quality measure for a given location may optionally take into account quality measures from the unique locations from which users navigated to the given location and/or to which users navigated from the given location. For example, where the geographical distance between a given location and another location i is represented by $D_i$, the quality measure of another location i is represented by $Q_i$, another location i is represented by $D_i$, the quality measure may be represented by: Quality Measure=$f(n; g(D_1, D_2, \ldots, D_n); h(Q_1, Q_2, \ldots, Q_n))$ wherein n is the number of locations associated with the given location.

Any determined quality measure for a given location may optionally be normalized. For example, in some implementations a determined quality measure may be normalized based on quality measures for similar locations. For example, a quality measure for a given location may be normalized based on quality measures for other locations in a similar geographic region of the given location. For example, the quality measure may be normalized based on quality measures for other locations in the same city as the given location and/or for other locations in one or more cities having similar characteristics of the city of the given location. Also, for example, a quality measure for a given location may be normalized based on quality measures for other locations that are of the same type as the given location. For example, a quality measure for a given location that is a restaurant may be normalized based on quality measures for other restaurants. Also, for example, a quality measure for a given location that is a fine dining restaurant may be normalized based on quality measures for other fine dining restaurants. Additional and/or alternative methods of normalizing determined quality measures for one or more locations may be utilized.

Figure 7A:
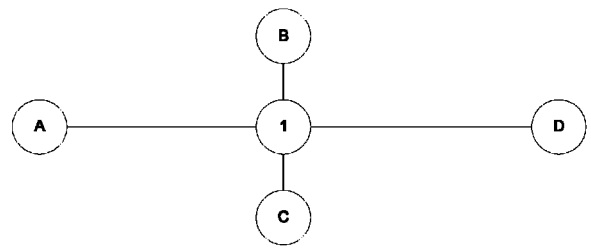
FIGS. 7A-7C illustrate examples of visits to or from a location.
Figure 7B:
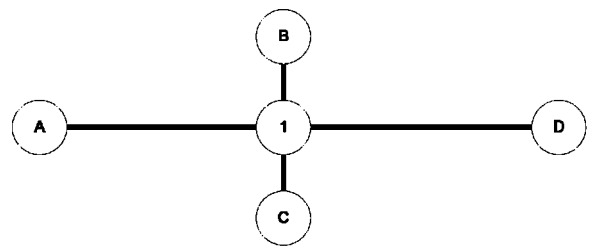
Figure 7C:
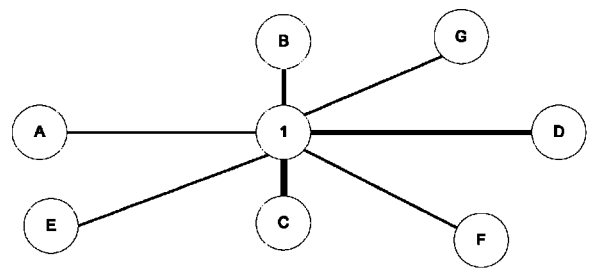

With reference to FIGS. 7A-7C, additional examples are illustrated of visits to or from a first location. In some implementations one or more of the visits may be to or from other locations. In some implementations one or more of the visits may indicate visits to or from the first location by different user groups. The examples of FIGS. 7A-C will be provided herein with respect to visits to or from other locations. In FIGS. 7A-7C location 1 indicates a given location for which a quality measure is being determined and the letters in each of FIGS. 7A-7C represent locations to which and/or from which one or more users have traveled to the location 1. In some implementations the letters may represent locations associated with one or more businesses or service entities such as a restaurant, a retail store, and/or a venue. In some implementations the letters may represent locations associated with a geographic region such as a neighborhood, a zip code, a county, and/or other defined geographic region. The lines between the locations indicate travel to or from the locations. In some implementations one or more of the lines may only indicate travel to location 1. In some implementations one or more of the lines may only indicate travel from location 1. In some implementations one or more of the lines may indicate travel to and from location 1. The length of each of the lines is indicative of the distance between the locations between which they extend and the weight of the arrows is indicative of the number of visits between the locations between which they extend.

As discussed herein, in some implementations the number of visits between the locations may be taken into account in determining a quality measure. In some implementations the number of visits between the locations may not be taken into account in determining the quality measure. For example, with reference to FIGS. 7A and 7B, location 1 is illustrated with indicated visits between locations A-D and the distance of the indicated visits between respective of locations A-D is the same in FIGS. 7A and 7B. In some implementations the quality measure for location 1 may be the same in FIGS. 7A and 7B (e.g., based on the four connections to location 1 and the distances between the connections). In some implementations the quality measure may additionally take into account the number of visits between the locations A-D and location 1 and, as a result, location 1 may have a quality measure more indicative of quality in FIG. 7B. In FIG. 7C location 1 is illustrated with additional connections to locations E, F, and G. In some implementations the quality measure of location 1 in the scenario of FIG. 7C may be more indicative of quality than the quality measure in FIGS. 7A and 7B due to the additional connections to locations E, F, and G.

Visit data of one or more databases such as content database 130 may be utilized in determining associations between two locations, determining a characteristic of a location, and/or determining a quality measure for a location. For example, content database 130 may include visit data for each of one or more locations. For example, content database 130 may include visit data for each of one or more locations that is associated with a group of users to the location from one or more locations. The information about the locations may include an identifier of the locations such as an address, a latitude and longitude, a zip code, a neighborhood, and/or other identifier. In this specification, the term "database" will be used broadly to refer to any collection of data. The data of the database does not need to be structured in any particular way, or structured at all, and it can be stored on storage devices in one or more locations. Thus, for example, the content database 130 may include multiple collections of data, each of which may be organized and accessed differently.

In some implementations visit data utilized in determining associations between a first location and one or more other locations, determining a characteristic of the first location, and/or determining a quality measure for the first location may be based on one or more searches related to the first location. For example, in some implementations the search system 115 may provide data in response to a user submitting a query. For example, the data provided by the search system 115 may be identified in response to direction queries. In some implementations, direction queries may provide a signal of the user's intent to visit a given location. For example, indications of visits to and/or from a first location may be based on received direction queries issued to the search system 115. For example, for a first location, distances and/or times between a second location and the first location may be provided by the search system 115 for storage in a database such as content database 130. For example, a record of direction queries may be stored that includes the source location of the direction query, the destination location of the direction query, and an indication of the distance and/or duration of travel from the source to the destination. The indication of the distance and/or duration of travel from the source to the destination may be based on, for example, a determined distance and/or duration of travel as determined by a mapping service. In some implementations any determined duration of travel may optionally take into account travel conditions at the time of the navigational query and/or after the navigational query.

In some implementations any utilized direction queries may optionally be verified based on additional data to increase a confidence level that the user will actually travel from the source location to the destination location. For example, geolocation data from a mobile device of a user associated with the direction query may be utilized to verify that the user actually went from the source location to the destination location. Also, for example, data from a user's social network profile may be utilized to verify that the user went from the source location to the destination location. For example, the user may check in to the destination location via the social network, and/or may post a comment related to the destination location. Also, for example, data from a user's search history and/or browsing history may be utilized to verify that the user will actually travel from the source location to the destination location. For example, when the location is a restaurant and the user searches for and/or views a menu of the restaurant after issuing a direction query for the restaurant, it may indicate that the user will actually travel from the source location to the destination location.

Also, for example, in some implementations the data may include data based on a navigation system providing active navigational direction from a destination to a source. For example, for a given location, distances and/or times between an initial location and the given location and/or the given location and a destination location may be provided by the navigation application for storage in a database such as content database 130. For example, a record of actual navigations may be stored that includes the source locations of the navigations, the destination locations of the navigations, and an indication of the distances and/or durations of travel from the sources to the destinations. The indication of the distance and/or duration of travel from the sources to the destinations may be based on, for example, actual distances and/or durations of travel as provided by the navigation application.

In some implementations any source and/or destination location data may specify a location in the form of a latitude, longitude pair. In some implementations any source and/or destination location data may specify a location in the form a textual address, for example, "1234 Example Road, City, Calif. 12345" or "Example Restaurant 12345".

In some implementations visit data indicating a visit between two locations and/or a distance of travel between the two locations may be additionally and/or alternatively identified based on geolocation data from personal electronic devices of users. For example, geolocation data may be identified from a mobile phone as a user moves with the mobile phone. For example, geolocation data may be provided by the mobile phone at certain time intervals as a user moves with the mobile phone. Any visit data based on geolocation data identified from a mobile phone or other electronic devices are not identifiable to a specific user. Geolocation data may be utilized as a source for determining travel from a source to a destination and/or may be utilized to verify other sources such as, for example, the navigational queries described herein. Geolocation data may be based on, for example, one or more of GPS data, cellular tower data, and/or Wi-Fi data.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. Also, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and/or used.

The search system 115, the connectedness measure determination system 120, and/or the location characteristic determination system 125 may be implemented in hardware, firmware, and/or software running on hardware. For example, one or more of the systems may be implemented in one or more computer servers.

In some implementations any distance values for a given location may be based on one or more distances and/or times determined via a mapping system. For example, in some implementations an actual distance value for a given location may be based on a navigational query of one or more users of a mapping service seeking directions to the given location from a source location and/or seeking directions from the given location to a destination location. In some implementations, one or more of the distance values may be determined by the search system 115, the connectedness measure determination system 120, and/or the location characteristic determination system 125 and stored in the content database 130.

In some implementations, one or more indications of travel between two locations and/or one or more distance values between two locations may be weighted. For example, in implementations in which an average distance value is determined between locations based on data from a plurality of users, the average distance value may be weighted more heavily in favor of data associated with certain users. For example, the average distance value between two locations may be weighted more heavily in favor of data associated with users for whom it can be verified they actually traveled between the two locations as compared to those who just provided an indication of intent to travel between the two locations. Also, for example, in implementations in which the number of visits between two locations are determined, visits associated with data for which it can be verified that travel between the two locations actually occurred may be weighted more in determining a number of visits as compared to visit data in which only an indication of intent to travel between the two locations is identified.

Any determined association between two locations, associations between a location and a user group, characteristic of a location, and/or quality measure of a location may be optionally stored in the content database 130. In some implementations a determined association between two locations, associations between a location and a user group, characteristic of a location, and/or quality measure of a location may be mapped with the location in the content database 130.

In some implementations, one or more locations may optionally be ranked based on any determined quality measure and/or other location characteristics. For example, in response to a search for a restaurant in downtown Chicago, the search system 115 may identify a plurality of search results for various restaurants in downtown Chicago. One or more of the search results may be ranked based at least in part on a quality measure and/or other characteristic associated with the location corresponding thereto. For example, ratings from 1 to 5 may be provided in the search results, each accompanied with one of the restaurants. The particular rating applied to one or more of the restaurants may be based at least in part on a quality measure. Also, for example, the display order of one or more of the restaurants may be based at least in part on the quality measure. Also, for example, the rating and/or display order of one or more of the restaurants may be determined based on one or more characteristic of the restaurants. For example, for a query seeking a restaurant with certain characteristics, those restaurants associated with the characteristic may be more prominently displayed.

In some implementations any quality measure of a location, characteristic of a location, associations between a location and a user group, and/or association between the location and another location may be utilized to modify and/or supplement existing information related to the location. For example, an existing rating of a location may be modified based on the quality measure. Also, for example, other characteristics associated with a location may be supplemented and/or modified based on determined characteristics. Also, for example, associations between a location and other determined locations may be supplemented and/or modified based on determined associations. Also, for example, associations between two or more locations may be identified based on one or more determined shared characteristics between the locations.

In some implementations, the connectedness measure determination system 120 and/or location characteristic determination system 125 may utilize visit data associated with one or more user attributes of the members in the population. These user attributes may include one or more latent types that have no natural interpretation, or may be semantically meaningful types. Accordingly, any determined quality measure of a location, characteristic of a location, and/or association between the location and another location may be specific to a particular group. In some implementations, the user attributes may be used to link selected groups of members to a determined quality measure of a location, characteristic of a location, and/or association between the location and another location may for a location based on the user.

The search system 115 may receive a user's query related to a location from a computing device 110, and execute the search query against a database of collection of documents such as web pages, images, text documents, and multimedia content to produce search results. The collection of documents may be stored in the content database 130, and/or on multiple computers and/or storage devices. A document in the collection of documents in the content database 130 may be a web page, a word processing document, a portable document format (PDF) document, or any other type of electronic document. In some implementations, the collection of documents in the content database 130 may be obtained from the World Wide Web. The search results may identify a ranked list of search result documents in the collection of documents in the content database 130 that are relevant to the user's query.

In some implementations, the search system 115 may use quality measures of one or more location, other characteristics of one or more locations, and/or associations between one or more locations to identify and/or rank search results. Any identified search results may be displayed in the web browser 112 or other application executing on the client computing device 110.

Many other configurations are possible having more or fewer components than the environment shown in FIG. 1. For example, in some environments the search system 115 and/or the content database 130 may be omitted. Also, for example, in some environments one or more of the connectedness measure determination system 120 and the location characteristic determination system 125 may be combined.

Figure 4:
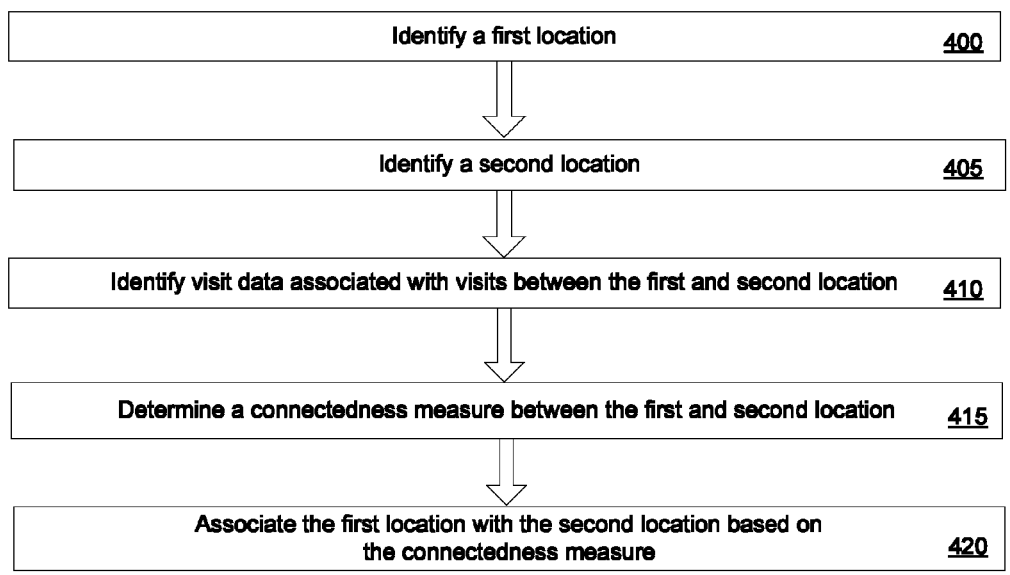
FIG. 4 is a flow chart illustrating an example method of associating a first location with a second location based on a connectedness measure between the first location and the second location.

Referring to FIG. 4, a flow chart illustrates an example method of associating a first location with a second location based on a connectedness measure between the first location and the second location. Other implementations may perform the steps in a different order, omit certain steps, and/or perform different and/or additional steps than those illustrated in FIG. 4. For convenience, aspects of FIG. 4 will be described with reference to a system of one or more computers that perform the process. The system may include, for example, the connectedness measure determination system 120 of FIG. 1.

At step 400, a first location is identified. In some implementations, the first location may be identified via the content database 130. For example, in some implementations, the first location may be identified based on a record of direction queries stored in content database 130.

At step 405, a second location is identified. In some implementations, the second location may be identified via the content database 130. For example, in some implementations, the second location may be identified based on a record of direction queries stored in content database 130.

At step 410 visit data associated with visits between the first location and the second location is identified. For example, the visit data may be determined via content database 130. For example, in some implementations the content database 130 may include visit data for each of one or more locations. Visit data for a given location may include, for example, for each of one or more visits to a location, data indicative of: origination location for the visit, destination location for the visit, distance between the origination location and the given location, distance between the given location and the destination location, residence time of the visit at the given location, residence time at the origination location, residence time at the destination location, date of the visit, day of the week of the visit, and/or time of the day of the visit. The visit data that is indicative of visits between the first and second location may be extracted from visit data of the first location and/or the second location.

At step 415 a connectedness measure between the first location and the second location is identified. The connectedness measure between the first location and the second location is based on the visit data identified at step 410 that is indicative of one or more users physically visiting the first location at least one of prior to or after physically visiting the second location. For example, the connectedness measure may be based on visit data of a plurality of users that indicates at least a threshold number of users indicating a visit between the first location and the second location. Also, for example, the connectedness measure may additionally be based on the geographical distance between the first location and the second location, wherein a connectedness measure becomes more indicative of correlation between the first and the second locations as geographical distance between the first and second locations increases. Also, for example, the connectedness measure may additionally be based on residence times of users at the first location and/or residence times of users at the second location.

At step 420, the first location is associated with the second location based on the connectedness measure. For example, if the connectedness measure between the first location and the second location satisfies a connectedness threshold, the first location may be associated with the second location. In some implementations the connectedness threshold may be based on the location type of the first location and/or the second location. In some implementations the connectedness threshold may be based on connectedness measures of other locations from which users travel to the first location and/or to which users travel from the first location. For example, if the connectedness measure between the first location and the second location is more indicative of connectedness than 95% of the other connectedness measures for the first location, then the first location may be associated with the second location. Also, for example, if the connectedness measure between the first location and the second location is more indicative of connectedness than a mean and/or median of the other connectedness measures for the first location, then the first location may be associated with the second location. Additional and/or alternative connectedness thresholds may be utilized.

Any determined association between the first location and the second location may optionally be stored in a database such as content database 130. Any stored association may optionally be utilized by one or more components. For example, a recommendation may be made to the user to visit the second location when the user visits the first location and/or indicates an intent to visit the first location. An intent to visit the first location may be identified, for example, via issuing a query (navigational or otherwise) for the first location, placing information about the first location in a calendar entry, etc. Also, for example, the search system 115 may utilize the association to identify and/or rank search results related to the first location and/or the second location. For example, the ranking of one or more search results related to the second location may be boosted any time search results related to the first location are identified as one of the top search results responsive to a query.

Figure 5:
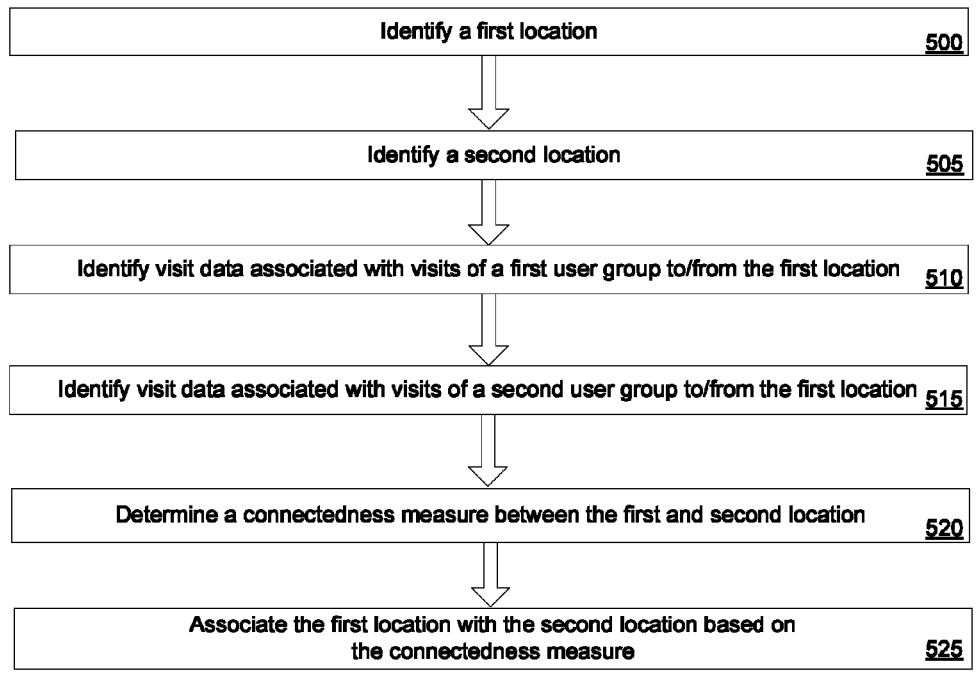
FIG. 5 is a flow chart illustrating another example method of associating a first location with a second location based on a connectedness measure between the first location and the second location.

Referring to FIG. 5, a flow chart illustrates another example method of associating a first location with a second location based on a connectedness measure between the first location and the second location. Other implementations may perform the steps in a different order, omit certain steps, and/or perform different and/or additional steps than those illustrated in FIG. 5. For convenience, aspects of FIG. 5 will be described with reference to a system of one or more computers that perform the process. The system may include, for example, the connectedness measure determination system 120 of FIG. 1.

At step 500, a first location is identified. In some implementations, the first location may be identified via the content database 130. For example, in some implementations, the first location may be identified based on a record of direction queries stored in content database 130. In some implementations step 500 may share one or more aspects in common with step 400 of FIG. 4.

At step 505, a second location is identified. In some implementations, the second location may be identified via the content database 130. For example, in some implementations, the second location may be identified based on a record of direction queries stored in content database 130. In some implementations step 505 may share one or more aspects in common with step 405 of FIG. 4.

At step 510 visit data associated with visits of a first user group to and/or from the first location is identified. For example, the visit data may be determined via content database 130. For example, in some implementations the content database 130 may include visit data for each of one or more locations. Visit data for a given location may include, for example, for each of one or more visits to a location, data indicative of: origination location for the visit, destination location for the visit, distance between the origination location and the given location, distance between the given location and the destination location, residence time of the visit at the given location, residence time at the origination location, residence time at the destination location, date of the visit, day of the week of the visit, and/or time of the day of the visit. The visit data that is indicative of a first user group to and/or from the first location may be extracted from visit data of the first location. In some implementations step 510 may share one or more aspects in common with step 410 of FIG. 4.

At step 515 visit data associated with visits of a second user group to and/or from the second location is identified. The first user group and the second user group may share one or more common attributes as described herein. The visit data that is indicative of a second user group to and/or from the second location may be extracted from visit data of the second location. In some implementations step 515 may share one or more aspects in common with step 410 of FIG. 4.

At step 520 a connectedness measure between the first location and the second location is identified. The connectedness measure between the first location and the second location is based on the visit data identified at steps 510 and 515 that is indicative of one or more users of a first user group physically visiting the first location and one or more users of a second user group physical visiting the second location. For example, the connectedness measure may be based on visit data of a plurality of users that indicates at least a threshold number of users of a first group indicating a visit to the first location and at least a threshold number of users of a second group indicating a visit to the second location. Also, for example, the connectedness measure may additionally be based on the determined distance of one or more of the users of the first group traveled in reaching the first location and/or the determined distance of one or more of the users of the second group traveled in reaching the second location, wherein a connectedness measure becomes more indicative of correlation between the first and the second locations as one or both geographical distances increases. Also, for example, the connectedness measure may additionally be based on residence times of users at the first location and/or residence times of users at the second location. In some implementations step 520 may share one or more aspects in common with step 415 of FIG. 4.

At step 525, the first location is associated with the second location based on the connectedness measure. For example, if the connectedness measure between the first location and the second location satisfies a connectedness threshold, the first location may be associated with the second location. In some implementations the connectedness threshold may be based on the location type of the first location and/or the second location. In some implementations the connectedness threshold may be based on connectedness measures based on other user groups. For example, if the connectedness measure is more indicative of connectedness than 95% of the other connectedness measures based on other user groups, then the first location may be associated with the second location. Also, for example, if the connectedness measure between the first location and the second location is more indicative of connectedness than a mean and/or median of the other connectedness measures, then the first location may be associated with the second location. Additional and/or alternative connectedness thresholds may be utilized. In some implementations step 525 may share one or more aspects in common with step 420 of FIG. 4.

Any determined association between the first location and the second location may optionally be stored in a database such as content database 130. Any stored association may optionally be utilized by one or more components.

Figure 6:
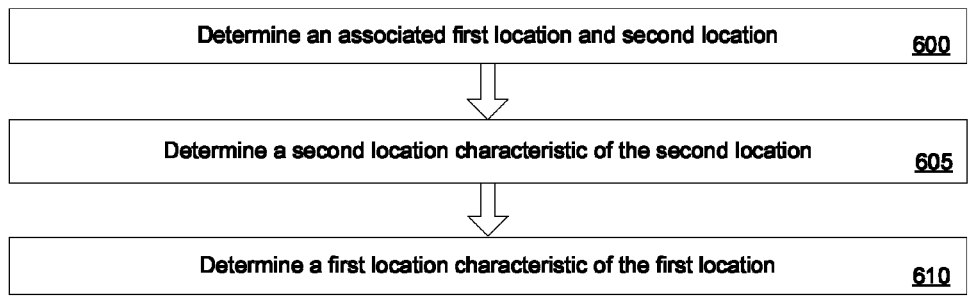
FIG. 6 is a flow chart illustrating an example method of determining a characteristic of a first location and/or a second location.

Referring to FIG. 6, a flow chart illustrates an example method of determining a characteristic of a first location and/or determining a characteristic of a second location. Other implementations may perform the steps in a different order, omit certain steps, and/or perform different and/or additional steps than those illustrated in FIG. 6. For convenience, aspects of FIG. 6 will be described with reference to a system of one or more computers that perform the process. The system may include, for example, the location characteristic determination system 125 of FIG. 1.

At step 600, an associated first location and second location are identified. In some implementations the associated first location and the second location may be identified via the content database 130. In some implementations an association between the first location and the second location may be identified utilizing the steps of the method of FIG. 4 and/or the steps of the method of FIG. 5.

At step 605, a second location characteristic of the second location is identified. In some implementations the second location characteristic of the second location may be identified via a database associating locations with one or more characteristics. For example, content database 130 may include a mapping between the second location and one or more characteristics associated with the second location. In some implementations the second location characteristic of the second location may additionally and/or alternatively be identified based on one or more attributes of one or more user groups indicating travel to the second location and/or the associated first location that satisfies a threshold number of users and/or a threshold determined distance traveled by the one or more groups.

At step 610, a first location characteristic of the first location is determined. In some implementations the first location characteristic is determined based on the second location characteristic of the second location identified at step 505. In some implementations the first location characteristic may be the same as the second location characteristic. For example, a characteristic that identifies the second location as expensive may be utilized to identify the second location as expensive. In some implementations the first location characteristic may be based on the characteristic of the second location, but is distinct from the characteristic of the second location. For example, a characteristic that identifies the second location as a formal venue may be utilized to identify the first location as a fine dining restaurant. Also, for example, a quality measure characteristic identifying the second location as a top-rated restaurant may be utilized to boost a quality measure characteristic of the first location, but the boosted quality measure of the second location may not be boosted to a top-rated level. In some implementations additional locations identified as associated with the first location must also have the second location characteristic or a similar characteristic before the first location characteristic of the first location is determined based on the second location characteristic.

In some implementations the first location characteristic of the first location may additionally and/or alternatively be identified based on one or more attributes of one or more user groups indicating travel to the first location and/or second location that satisfies a threshold number of users and/or a threshold determined distance traveled by the one or more user groups.

In some implementations the first location characteristic may additionally be based on user attributes of the visit data, residence time of one or more users in the first location, and/or residence time of one or more users in the second location. For example, the residence time at the first location may be utilized to determine a likely user activity at the first location and/or the residence time at the second location may be utilized to determine a likely user activity at the second location to assist in determining the first characteristic.

Any determined characteristic of the first and/or second location may optionally be stored in a database such as content database 130. Any stored characteristic may optionally be utilized by one or more components. For example, search results related to the first location may optionally be provided with an indication of the determined characteristic. Also, for example, the search system 115 may utilize the characteristic to identify and/or rank search results related to the first location.

Figure 8:
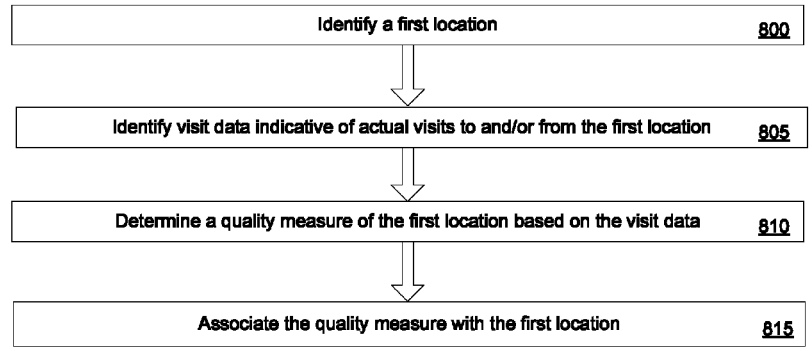
FIG. 8 is a flow chart illustrating an example method of determining a quality measure for a first location based on the number of other locations to which and/or from which users navigated from or to the first location and geographical distances between the other locations and the first location.
Figure 9:
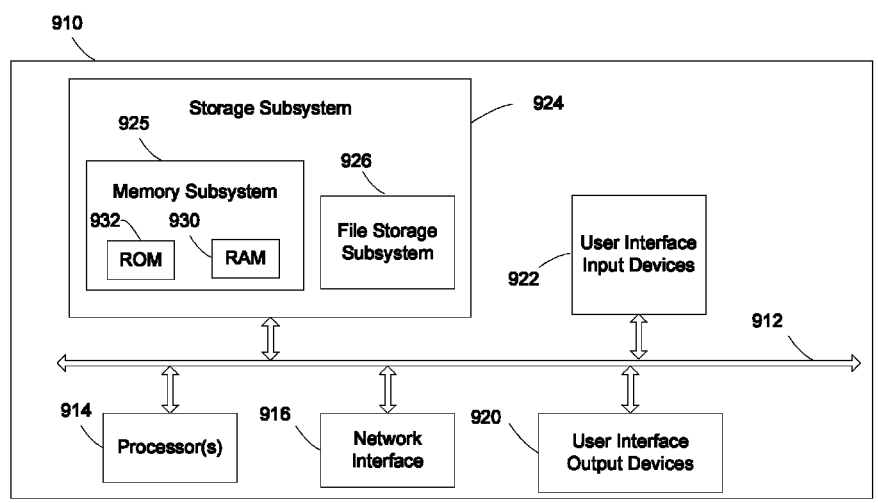
FIG. 9 illustrates a block diagram of an example computer system.

Referring to FIG. 8, a flow chart illustrates an example method of determining a quality measure for a first location based on the number of other locations to which and/or from which users navigated from or to the first location and geographical distances between the other locations and the first location. Other implementations may perform the steps in a different order, omit certain steps, and/or perform different and/or additional steps than those illustrated in FIG. 8. For convenience, aspects of FIG. 8 will be described with reference to a system of one or more computers that perform the process. The system may include, for example, the location characteristic determination system 125 of FIG. 1.

At step 800, a first location is identified. In some implementations, the first location may be identified via the content database 130. For example, in some implementations, the first location may be identified based on a record of direction queries stored in content database 130. Step 800 may share one or more aspects in common with step 400 of FIG. 4 and/or step 500 of FIG. 5.

At step 805, visit data indicative of actual visits to and/or from the first location is identified. For example, the visit data may be determined via content database 130. For example, in some implementations the content database 130 may include visit data for each of one or more locations. Visit data for a given location may include, for example, for each of one or more visits to a location, data indicative of: origination location for the visit, destination location for the visit, distance between the origination location and the given location, distance between the given location and the destination location, residence time of the visit at the given location, residence time at the origination location, residence time at the destination location, date of the visit, day of the week of the visit, and/or time of the day of the visit. Step 805 may share one or more aspects in common with step 410 of FIG. 4 and/or with step 510 or 515 of FIG. 5.

At step 810 a quality measure of the first location is identified based on the visit data. In some implementations the quality measure for the first location is determined based on the number of other locations to which and/or from which users navigated from or to the first location and geographical distances between the other locations and the first location. For example, a quality measure for a given location may be more indicative of quality as the number of locations from which users navigate to the given location increases and/or as the distances traveled by the users increases. For example, when a given location is a restaurant the number of zip codes from which users navigate to the restaurant and/or the distance between the zip codes and the restaurant may be utilized to determine a quality measure of the restaurant. Step 810 may share one or more aspects in common with step 815 of FIG. 4 and/or step 520 of FIG. 5.

In some implementations the quality measure for the first location may additionally and/or alternatively be determined based on the number of particular user groups that navigated from or to the first location and geographical distances travelled to or from the first location. For example, a quality measure for a given location may be more indicative of quality as the number of user groups that navigate to the given location increases and/or as the distances traveled by the user groups increases.

At step 815, the quality measure is associated with the first location. Any determined quality measure for the first location may optionally be stored in a database such as content database 130. Any stored quality measure may optionally be utilized by one or more components. For example, a quality measure may be utilized to adjust and/or determine a rating associated with the first location. Also, for example, the search system 115 may utilize the quality measure to rank search results related to the first location. For example, the ranking of one or more search results related to the first location may be based on the quality measure. Step 815 may share one or more aspects in common with step 420 of FIG. 4 and/or step 525 of FIG. 5.

FIG. 8 is a block diagram of an example computer system 810. Computer system 810 typically includes at least one processor 814 which communicates with a number of peripheral devices via bus subsystem 812. These peripheral devices may include a storage subsystem 824, including, for example, a memory subsystem 826 and a file storage subsystem 828, user interface input devices 822, user interface output devices 820, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 may include the logic to determine a characteristic of a location based on visit data associated with the location.

These software modules are generally executed by processor 814 alone or in combination with other processors. Memory 826 used in the storage subsystem can include a number of memories including a main random access memory (RAM) 430 for storage of instructions and data during program execution and a read only memory (ROM) 432 in which fixed instructions are stored. A file storage subsystem 828 can provide persistent storage for program and data files, and may include a hard disk drive, a floppy disk drive along with associated removable media, a CD-ROM drive, an optical drive, or removable media cartridges. The modules implementing the functionality of certain implementations may be optionally stored by file storage subsystem 828 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 4 is intended only as a specific example for purposes of illustrating some implementations. Many other configurations of computer system 810 are possible having more or fewer components than the computer system depicted in FIG. 8.

While several inventive implementations have been described and illustrated herein, a variety of other means and/or structures for performing the function and/or obtaining the results and/or one or more of the advantages described herein may be utilized, and each of such variations and/or modifications is deemed to be within the scope of the inventive implementations described herein. More generally, all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

As used herein in the specification and in the claims, the term "database" will be used broadly to refer to any collection of data. The data of the database does not need to be structured in any particular way, or structured at all, and it can be stored on storage devices in one or more locations.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
    identifying, by one or more processors, a first location associated with a first geographic location;
    identifying, by the one or more processors, a second location associated with a second geographic location;
    identifying visit data indicative of physical visits to one of the first and second locations that originated from the other of the first and second locations;
    determining a first time value indicative of time spent at the first location during one or more of the physical visits;
    determining a second time value indicative of time spent at the second location during one or more of the physical visits;
    determining, by the one or more processors, a connectedness measure between the first location and the second location based on the visit data, the connectedness measure indicative of correlation between the first location and the second location, wherein the connectedness measure is based on a quantity of physical visits to one of the first and second locations that originated from the other of the first and second locations as indicated by the visit data, as well as the first time value and the second time value;
    storing, by the one or more processors, in a machine-readable database, an indication of correlation between the first location and the second location when the connectedness measure satisfies a connectedness threshold; and
    ranking, by the one or more processors, the first or second location based at least in part on the connectedness measure.

2. The method of claim 1, wherein the step of determining the connectedness measure includes:
    determining at least one distance value from the visit data, the distance value indicative of geographic distance between the first location and the second location; and
    determining the connectedness measure based at least in part on the distance value.

3. The method of claim 2, wherein the connectedness measure becomes more indicative of correlation between the first location and the second location as the distance value becomes more indicative of a greater geographic distance between the first location and the second location.

4. The method of claim 1, wherein the connectedness measure is less indicative of correlation between the first location and the second location if at least one of the first time value and the second time value fail to satisfy a time value threshold.

5. The method of claim 1, further comprising:
  determining at least one second location characteristic of the second location; and
  determining at least one first location characteristic of the first location based on the second location characteristic of the second location.

6. The method of claim 5, wherein the step of determining the at least one first location characteristic of the first location based on the second location characteristic of the second location is dependent on the connectedness measure between the first location and the second location satisfying the connectedness threshold.

7. The method of claim 5, wherein the first location characteristic and the second location characteristic are both location type characteristics.

8. The method of claim 7, wherein the first location characteristic is unique from the second location characteristic.

9. The method of claim 8, wherein the location type for the first location is a venue and the location type for the second location is a restaurant.

10. The method of claim 5, wherein the step of determining the first location characteristic includes:
  determining the first location characteristic based at least in part on the first time value or the second time value.

11. The method of claim 5, wherein the first location characteristic and the second location characteristic are both quality measures.

12. The method of claim 5, wherein the visit data is associated with a first user group.

13. The method of claim 12, wherein the first location characteristic of the first location is based on the first user group.

14. The method of claim 13, further comprising determining a frequency of one or more user attributes in the first user group.

15. The method of claim 14, wherein the first location characteristic of the first location is based on the frequency of the one or more user attributes.

16. The method of claim 1, wherein the visit data is associated with a first user group.

17. A system including memory and one or more processors operable to execute instructions stored in the memory, comprising instructions to:
  identify a first location associated with a first geographic location;
  identify a second location associated with a second geographic location;
  identify visit data indicative of physical visits to one of the first and second locations that originated from the other of the first and second locations;
  determine a first time value indicative of time spent at the first location during one or more of the physical visits;
  determine a second time value indicative of time spent at the second location during one or more of the physical visits;
  determine a connectedness measure between the first location and the second location based on the visit data, the connectedness measure indicative of correlation between the first location and the second location, wherein the connectedness measure is based on a quantity of physical visits to one of the first and second locations that originated from the other of the first and second locations as indicated by the visit data, as well as the first time value and the second time value;
  store, in a machine-readable database, an indication of correlation between the first location and the second location when the connectedness measure satisfies a connectedness threshold; and
  rank the first or second location based at least in part on the connectedness measure.

18. The system of claim 17, wherein the step of determining the connectedness measure further includes instructions to:
  determine at least one distance value from the visit data, the distance value indicative of geographic distance between the first location and the second location;
  determine the connectedness measure based at least in part on the distance value.

19. The system of claim 18, wherein the connectedness measure becomes more indicative of correlation between the first location and the second location as the distance value becomes more indicative of a greater geographic distance between the first location and the second location.

20. The system of claim 17, wherein the connectedness measure is less indicative of correlation between the first location and the second location if at least one of the first time value and the second time value fail to satisfy a time value threshold.

21. The system of claim 17, wherein the instructions further include instructions to:
  determine at least one second location characteristic of the second location; and
  determine at least one first location characteristic of the first location based on the second location characteristic of the second location.

22. The system of claim 21, wherein the instruction to determine the first location characteristic include instructions to:
  determine the first location characteristic based at least in part on the first time value or the second time value.

23. The system of claim 21, wherein the visit data is associated with a first user group, and wherein the instructions further include instructions to determine frequency of one or more user attributes in the first user group.

24. The system of claim 23, wherein the first location characteristic of the first location is based on the frequency of the one or more user attributes.

25. A non-transitory computer readable storage medium storing computer instructions executable by a processor to perform a method comprising:
  identifying a first location associated with a first geographic location;
  identifying a second location associated with a second geographic location;
  identifying visit data indicative of physical visits to one of the first and second locations that originated from the other of the first and second locations;
  determine a first time value indicative of time spent at the first location during one or more of the physical visits;
  determine a second time value indicative of time spent at the second location during one or more of the physical visits;
  determining a connectedness measure between the first location and the second location based on the visit data, the connectedness measure indicative of correlation between the first location and the second location, wherein the connectedness measure is based on a quantity of physical visits to one of the first and second locations that originated from the other of the first and second locations as indicated by the visit data, as well as the first time value and the second time value;
  storing, in a machine-readable database, an indication of correlation between the first location and the second location when the connectedness measure satisfies a connectedness threshold; and ranking the first or second location based at least in part on the connectedness measure.

* * * * *